United States Patent
Dyer

(10) Patent No.: US 6,546,983 B1
(45) Date of Patent: Apr. 15, 2003

(54) TIRE WITH BURIED OVERLAY

(75) Inventor: Dale Kenneth Dyer, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/581,453

(22) PCT Filed: Feb. 16, 1998

(86) PCT No.: PCT/US98/02828

§ 371 (c)(1),
(2), (4) Date: Jun. 12, 2000

(87) PCT Pub. No.: WO99/41092

PCT Pub. Date: Aug. 19, 1999

(51) Int. Cl.$^7$ ................................ B60C 9/18; B60C 9/26
(52) U.S. Cl. .................... 152/526; 152/528; 152/529; 152/531; 152/535; 152/536
(58) Field of Search ............................ 152/8, 526, 528, 152/529, 531, 533, 535, 536

(56) References Cited

U.S. PATENT DOCUMENTS

| 4,183,389 | A | * | 1/1980 | Grosch | 152/528 |
| 4,791,973 | A | * | 12/1988 | Davisson | 152/526 |
| 5,277,239 | A | * | 1/1994 | Okihara | 152/529 |
| 5,323,829 | A | * | 6/1994 | Hubbell | 152/527 |
| 5,332,018 | A | * | 7/1994 | Roesgen | 152/528 |

FOREIGN PATENT DOCUMENTS

| BE | 673 944 A | 6/1966 | |
| DE | 19 43 842 A | 3/1971 | |
| EP | 0 237 599 | 9/1987 | B60C/9/26 |
| EP | 0 327 955 A | 8/1989 | B60C/9/26 |
| EP | 0 479 065 A | 4/1992 | B60C/9/22 |
| FR | 1 228 241 A | 8/1960 | |
| FR | 2 246 404 A | 5/1975 | B60C/9/02 |

\* cited by examiner

*Primary Examiner*—Jeff H. Aftergut
*Assistant Examiner*—Justin Fischer
(74) *Attorney, Agent, or Firm*—Nancy T. Krawczyk; David E. Wheeler

(57) ABSTRACT

A pneumatic tire with a folded belt structure comprises a cut belt and an overlay encompassed by folded over edges of the folded belt. Low aspect ratio tires for high performance automobiles having this structure can be made using a variety of materials.

4 Claims, 2 Drawing Sheets

TIRE WITH BURIED OVERLAY

TECHNICAL FIELD

The invention relates to high performance tires having a folded belt, a cur belt and an overlay wherein the folded belt has edges folded over both the cut belt and the overlay.

BACKGROUND OF THE INVENTION

It is continually the goal of the tire industry to improve the performance of tires used in racing and on high performance stock automobiles. Desirable chamacteristics of such tins are lightweight, low drag, good traction, minimal runout, low noise, good handling, and low tradwear.

It is also a goal in the tire industry to engineer He constructions for specific conditions and uses. It has been found that optimizing handling using one construction, or high-speed durability using another construction, is possible.

It is the object of the present invention to provide lighter weight tires, which have improved or maintained physical properties. It is also an object of the invention to identify tire construction changes that alter the properties of a tire to optimize their use under different conditions. Other objects of the invention will be apparent from the following specification and claims.

BACKGROUND ART

EP 237,599 teaches polyaromatic amide fiber cords folded over a cut carbon fiber belt.

U.S. Pat. No. 4,644,988 teaches a folded glass belt structure in a tire.

Oare et al, in U.S. Pat. No. 5,115,853, and references cited therein, teach the use of overlays in tires. The references teach various materitals that can be used, and various gauges of such materials that are used in building tires, as well as various tire constructions.

Breny, in U.S. Pat. No. 5,437,321 teaches a high performance tire where an overlay is used in place of a cut belt, and a folded belt is folded over edges of the overlay.

Roesgen et al. in U.S. Pat. No. 5,332,018 teach a tire construction using a folded belt structure which comprises a folded belt, a cut belt, and an overlay, having some embodiments wherein the overlay is located between the folded edges of a folded belt.

Hubbell et al, in U.S. Pat. No. 5,323,829 teach a high performance tire having a folded belt structure wherein one embodiment comprise a folded belt folded over the edges of a cut belt, and an overlay covering the full width of a folded belt, including the folded over edges.

French Pat. 1,228,24 discloses a pneumatic fire having a folded belt structure (2) comprising one folded belt (5), a cut bell (4) and an overlay (6) disposed over a carcass ply (1), and tread rubber (3) disposed over the belt structure. Folded edges (5a) of folded belt (5) are folded over the edges of the cut belt (4) and overlay (6). "Belt" refers to plies of parallel cords, woven or unwoven, underlying the tead, unanchored to the bead, and having cord angles of from 17 to 27 degrees with respect to the equatorial plane of the tire. "Cut belt ply" refers to a belt having a width less than the tread width which lies flat over the carcass plies in the crown area of the tire. "Crown" refers to that portion of the tire within the width limits of the tile tread in the area of the tire tread. "Carcass ply" refers to plies of parallel cords anchored to both beads of the tire. "Overlay" refers to fabric or fiber reinforced rubber having a width substantially equivalent to the tread width which is placed over the belt structure in a tire to minimize delamination at the belt edges and to provide a smoother ride. "High Performance Automobile" refers to stockcars that are designed for high speed such as Corvettes, LAborghini, Ferrari, Porsche, etc.

SUMMARY OF THE INVENTION

A pneumatic tire (10) comprises a pair of substan=aly parallel annular beads (12,12a), at least one reinforced carcass ply (14) wrapped around the pair of beads, a folded belt structure comprising at least one folded belt (22) and at least one cut belt (24) and an overlay (26) disposed over the at kast one carcass ply (14), tead rubber (18) disposed over the folded belt structure (22), and sidewalls (20) disposed between the beads (12,12a) and the tread rubber (18). In the illumed embodiment, the overlay (26) substantially covers edges of the cut belt (24) and is adjacent to the cut belt, and folded edges (22a,22b) of the folded belt (22) are folded over edges of the at least one cut belt (24) and the overlay (22).

The folded belt (22) may be reinforced with filaments or cords selected from the group consisting of fiberglass, aramid, carbon fibers, nylon, rayon, polyester, polyol, and mixtures thereof, and the cut belt (24) may be renforced with filaments or cords selected from the group consisting of steel, fiberglass, aramid, carbon fibers, nylon, rayon, polyester, polyol, and Cures thereof.

The overlay (26) is reinforced with filaments or cords selected from We group consisting of fiberglass, aramid, carbon fibers, nylon, polyester, polyol, and mixtures thereof.

In the illustrated embodiment, the overlay is cut overlay (30) (a single set of reinforced overlay material), although other types of overlay (30a), such as spiral overlay, and chopped overlay can be used.

An illustrated tire (10) of the invention has an aspect ratio of 0.45 to 0.55 and has a folded belt (22) and a cut belt (24) reinforced with fiberglass cords, and an overlay (26) reinforced with nylon cords.

Specific alternative tire constructions are described.

DETAILED DESCRIPTION OF THE INVENTION

Figure 1:
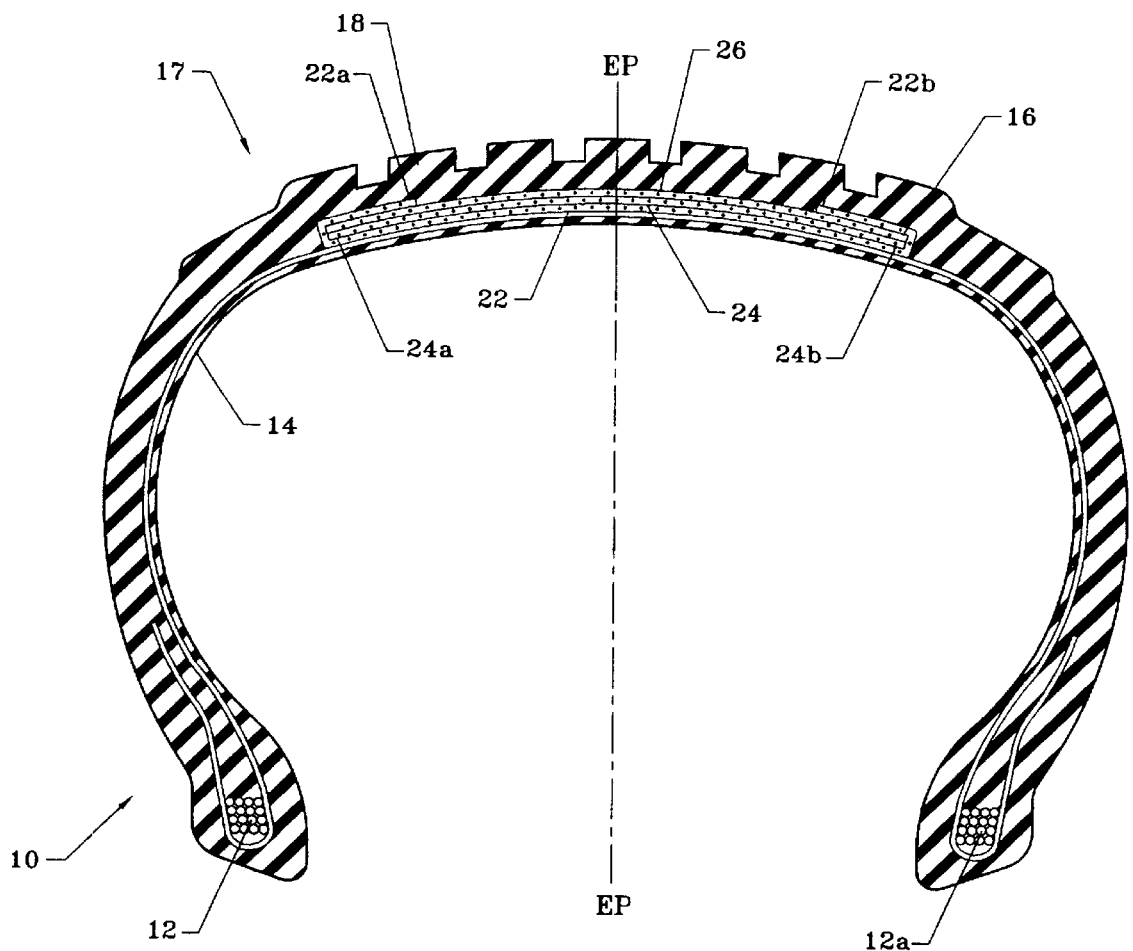
FIG. 1 illustrates a pneumatic tire of the invention.

With reference now to FIG. 1, a pneumatic tire 10 is illustrated having a pair of beads 12, 12a, radial carcass ply(s) 14 having longitudinal reinforcement members wrapped around beads 12, 12a, folded belt structure 16 disposed over carcass ply 14 in a crown area 17 of the tire, tread portion 18 disposed over folded belt structure 16, and sidewalls 20 disposed between tread 18 and beads 12, 12a. Folded belt structure 16 further comprises first (folded) belt 22, an additional cut belt 24, and overlay 26.

To form folded belt structure 16, in the building of tire 10, first belt 22, having a width exceeding the tread width of the tire, is laid down over carcass ply 14 in the crown region 17 of the tire. Thereafter, cut belt 24, having a width substantially equivalent to the tread width of the tire, is laid down over first belt 22, and overlay 26 is disposed over cut belt 24, and the sides 22a, 22b of first belt 22 are folded over the edges 24a, 24b of cut belt 24 with overlay 26 interposed there between.

In one embodiment, first belt 22 comprises substantially parallel longitudinal reinforcement cords which are oriented with an angle of about 18–30°, preferably 24–28° with respect to the equatorial plane of the tire. The longitudinal reinforcement of the first belt 22 may be filaments or cords selected from the group comprising fiberglass, aramid, carbon fibers, nylon, rayon, polyester, polyol, and mixtures thereof.

In a first embodiment of a tire of the invention, cut belt 24 may comprise a steel belt ply comprising 16–24 epi of 2×0.30 mm diameter high tensile steel wires oriented at 18–30° with respect to the equatorial plane of the tire. In alternative embodiments, cut belt 24 may be reinforced with filaments or cords selected from the group comprising steel, fiberglass, aramid, carbon fibers, nylon, rayon, polyester, polyol, and mixtures thereof.

Those skilled in the art will recognize that any conventional belt structure and belt material may be used in the cut belt of the tire of the invention.

Figure 2:
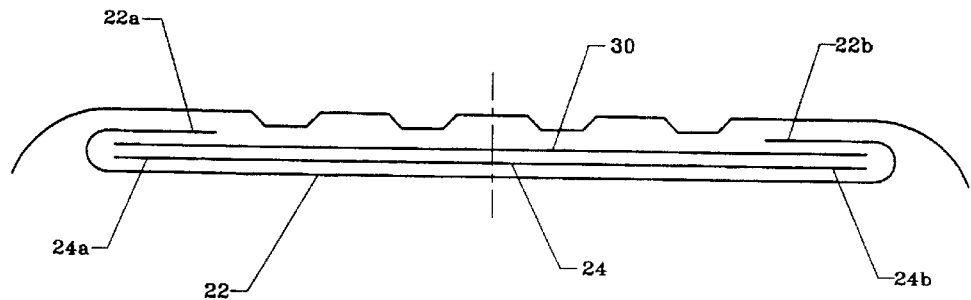
FIG. 2 illustrates a folded belt structure of the invention.
Figure 3:
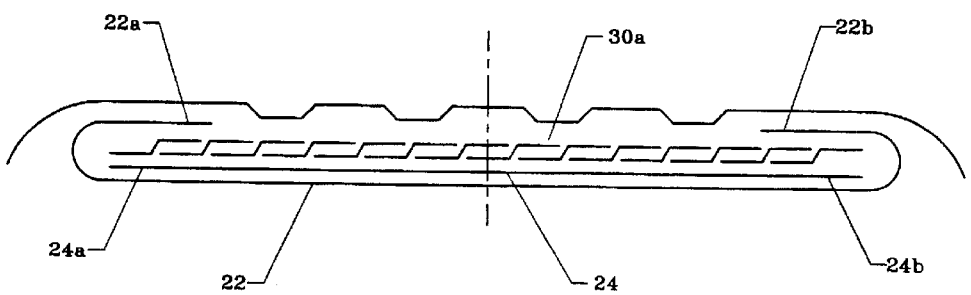
FIG. 3 illustrates an alternative folded belt structure of the invention.

With reference now to FIGS. 2 and 3, the illustrated tires of the invention include an overlay structure 30,30a comprising 1 to 4 turns of overlay material, preferably at least 2 turns of overlay material comprising nylon fabric, to be applied to the folded belt structure prior to folding over of folded belt edges 22a,22b. The overlay structure serves to control tire growth, and to help hold the edges of the folded belt structure in place. Preferably, the nylon overlay comprises 1260/2, 850/1, 840/2, 420/2 or 210/2 denier nylon cords that may be woven or unwoven.

By "cut overlay", it is meant that the overlay material is prepared in a sheet of reinforced composite, and the whole composite sheet is applied to the tire in the building process in one step. "Chopped overlay" refers to a cut overlay where the reinforcing cords are randomly discontinuous, which allows expansion of the overlay without stress when the tire is expanded in the tire building process. "Spiral overlay" refers to a ribbon of composite material that is laid up spirally across the crown of the tire in the tire building process.

Figure 4:
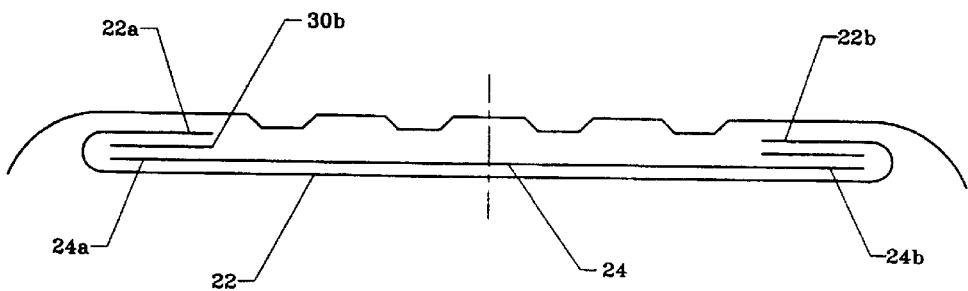
FIG. 4 illustrates an embodiment where overlay is applied to cut belt edges before folding of the folded belt.

It has been theorized that the overlay under the folded belt edges prevents friction between the cut belt and the folded belt, and extends the arc of the folded belt edges, thereby reducing compression fatigue at the folded edges. Since overlay at the edges of the cut belt achieves these purposes, in a further embodiment of the invention, represented by FIG. 4, it is contemplated that overlay strips 32 may be applied at the edges only of the cut belt.

If the overlay is somewhat narrower that the cut belt, the arc of the folded belt edges may be extended further, and accordingly, the overlay may have the same width as the cut belt, or may have a width that is 90% to 99% of the width of the cut belt.

When a cut overlay is used, it may be applied in the tire using an angled overlap, for example a 45° overlap splice, a straight or 90° overlap splice, or a butt splice.

The overlay may be reinforced with filaments or cords selected from the group consisting of fiberglass, aramid, carbon fibers, nylon, polyester, polyol, and mixtures thereof. Those skilled in the art will recognize that other overlay materials can be used.

Alternative materials that may be used in the overlay structure include short fiber composites.

The folded belt structure can be used in tires having nylon, polyaramide, polyester or steel carcasses, or carcasses comprising mixtures of these materials. The tires can be made with cut overlays, chopped overlays, or spiral wrap overlays.

FIG. 2 represents a belt structure with an overlay which may be a cut overlay or a chopped overlay, the constructions of each being well represented in the prior art. FIG. 3 represents a belt structure made with a spiral overlay, spiral overlays having many alternative constructions represented in the prior art.

In the illustrated embodiment, the reinforcing members in the carcass ply comprise 1000/2, 1000/3 polyester filaments. In an alternative embodiments, such reinforcing members may comprise carbon fiber cords, steel cords, polyesters, polyamides, polyolefins, and other synthetic reinforcing materials known in the art, and mixtures thereof.

Tires of the invention preferably have an aspect ratio of 0.45 to 0.55.

The invention is further illustrated with reference to the following example:

EXAMPLES

A tire size 27.5×12.0–15 was laid up on a tire building drum using but splices for the carcass plies and belts. The belt comprised fiberglass having a fabric dtex of 370/2 (denier of 330/2) and a green end count of 7.9 epc (ends per centimeter) (20 epi (ends per inch)). After the carcass ply and the first and second belts were applied to the building drum, a chopped overlay was applied over the second belt using a 45-degree lap splice. The edges of the first (folded) belt were then turned over the edges of the second (cut) belt and the overlay. Tread and sidewalls were applied as is conventional in the art, and the tire was cured as is conventional in the art.

The tire of the invention was made using the same materials and specifications as a prior art tire made according to U.S. Pat. No. 5,323,829, except that the overlay was placed directly over the cut belt, and the folded belt was folded over both the cut belt and the overlay. In the example, the overlay had the same width as the cut belt, and a sheet of 940/2 dTex (840/2 denier) nylon with an end count of 10.6 epc (27 cpi) was used for the overlay. The overlay was applied having an overlap splice of 0.2 to 1.2 cm (0.5 to 3 inches).

Tires of the invention were compared with control tires that were made the same except that the overlay was applied after the folded belt edges were turned up.

Since stresses on tires on a car driven on an oval track are higher on right side tires, data for durability herein is provided for right side tires only.

In the durability test, the first step is a break-in. The tires are run on a lab wheel under controlled conditions of load, tire speed and inflation for a specified period of time. In the second step, dynamic conditions are applied to the tire that simulate actual conditions on the race track regarding loads, speeds, tire pressures, cambers, duration and yaw cycles.

The durability test is run for a maximum of 60 minutes (min.). Tires that survive this rigorous test for 60 minutes with no signs of damage or degradation are considered to be excellent, tires that survive for 45–59 minutes are considered to be good, tires that survive for 30–45 min. are acceptable, and tires that survive for 20–30 minutes are considered to be unacceptable.

In the test, the following results were achieved. The control tires are the prior art tires according to the '829 patent discussed above.

| Time run | No. Control tires | No. Test tires |
|---|---|---|
| 60 min | 15 | 22 (all) |
| 45–59 min | 12 | |
| 30–45 min | 13 | |
| 20–30 min | 6 | |

There have been no instances of durability failures in race track testing using the construction of the tire of the invention in this example.

All other properties of the control and invention tires were equivalent. The test shows that the durability of the times of the invention is substantially increased as compared to the prior art control tires.

What is claimed is:

1. A pneumatic tire (10) comprising a pair of substantially parallel annular beads (12,12a), at least one reinforced carcass ply (14) wrapped around said pair of beads, a folded belt structure comprising at least one fiberglass folded belt (22) and at least one fiberglass cut belt (24) and a cut nylon overlay (26) disposed over said at least one carcass ply (14), tread rubber (18) disposed over said folded belt structure, and sidewalls (20) disposed between said beads (12,12a) and said tread rubber (18), wherein said overlay (26) is a chopped overlay has a width which is 90 to 99% of the width of the cut belt and substantially covers edges of said cut belt (24) and is adjacent to said cut belt (24), and folded edges (22a,22b) of said folded belt (22) are folded over edges of said at least one cut belt (24) and said overlay (26).

2. The tire of claim 1 having an aspect ratio of 0.45 to 0.55.

3. The tire of claim 1 wherein said belts are 330/2 denier having a green epi of 20, and said overlay is 840/2 denier with an end count of 27 epi.

4. The pneumatic tire of claim 1 wherein the overlay is applied in the tire using a 45° lap splice.

* * * * *